(12) United States Patent
Alioto et al.

(10) Patent No.: US 9,222,487 B2
(45) Date of Patent: Dec. 29, 2015

(54) TANK BREATHER ASSEMBLY AND MOUNTING CONFIGURATION

(71) Applicant: Caterpillar Inc., Peoria, IL (US)

(72) Inventors: Vincent Alioto, Villa Park, IL (US); Shaun Currier, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 6 days.

(21) Appl. No.: 13/691,606

(22) Filed: Nov. 30, 2012

(65) Prior Publication Data

US 2014/0151386 A1 Jun. 5, 2014

(51) Int. Cl.
*F16K 24/04* (2006.01)
*F15B 1/26* (2006.01)
*F15B 21/04* (2006.01)

(52) U.S. Cl.
CPC .............. *F15B 1/26* (2013.01); *B01D 2279/35* (2013.01); *F15B 21/044* (2013.01); *Y10T 137/598* (2015.04)

(58) Field of Classification Search
CPC ... B01D 2279/35; F15B 21/044; F16K 24/04; B65D 51/36; B65D 51/1605; B65D 51/1611; B65D 51/1616; B65D 2205/00; B65D 47/32; B65D 90/34
USPC .......... 220/745, 746, 747, 371, DIG. 33, 372, 220/562, 581, 582, 86.2, 88.1, 88.2, 220/DIG. 32; 55/505, 486, DIG. 19; 96/135, 96/138, 188, 189
See application file for complete search history.

(56) References Cited

U.S. PATENT DOCUMENTS

| | | | | |
|---|---|---|---|---|
| 1,528,489 | A | * 3/1925 | Kessler | 220/88.2 |
| 1,567,580 | A | 12/1925 | Eschholz | |
| 1,570,461 | A | * 1/1926 | Cohn | 220/88.2 |
| 1,841,691 | A | 1/1932 | Wilson | |
| 1,874,414 | A | 8/1932 | Anschicks | |
| 1,960,657 | A | 5/1934 | Alexander | |
| 2,088,226 | A | * 7/1937 | Arvintz | 210/431 |
| 2,112,641 | A | * 3/1938 | Wheaton | 137/512.1 |
| 2,733,775 | A | * 2/1956 | Dupure | 210/348 |

(Continued)

FOREIGN PATENT DOCUMENTS

| | | |
|---|---|---|
| JP | 2004-360768 | 12/2004 |
| JP | 2006-029013 | 2/2006 |

OTHER PUBLICATIONS

Pending U.S. Patent Application, entitled "Tank Splashguard With Multi-Tiered Labyrinth,", filed Nov. 30, 2012.

(Continued)

*Primary Examiner* — Fenn Mathew
*Assistant Examiner* — Robert Stodola
(74) *Attorney, Agent, or Firm* — Finnegan, Henderson, Farabow, Garrett & Dunner, LLP

(57) ABSTRACT

A breather assembly is disclosed for use with a fluid tank. The breather assembly may include a mounting collar having a first end and an opposing second end. The first end of the mounting collar may be connected to a distal end of a fluid tank spout. The breather assembly may also include a breather insert connected to the mounting collar. The breather insert may have a perforated screen extending a distance past a base end of the fluid tank spout. The breather assembly may further include a breather cap having a first end and an opposing second end. The first end of the breather cap may be connected to the breather insert. The breather cap may also have a passage in common with a hollow center of the mounting collar.

15 Claims, 3 Drawing Sheets

(56) References Cited

U.S. PATENT DOCUMENTS

| | | | |
|---|---|---|---|
| 3,130,025 A * | 4/1964 | Bowden et al. | 55/503 |
| 3,167,416 A * | 1/1965 | Humbert, Jr. et al. | 55/498 |
| 3,853,763 A * | 12/1974 | Hall | 210/130 |
| 4,147,096 A * | 4/1979 | Caswell | 454/20 |
| 5,328,566 A * | 7/1994 | Yokoyama et al. | 162/152 |
| 6,076,471 A * | 6/2000 | Burian et al. | 105/377.07 |
| 6,217,639 B1 * | 4/2001 | Jackson | 96/134 |
| 6,520,200 B1 | 2/2003 | Lawrukovich et al. | |
| 7,309,367 B2 | 12/2007 | Heikamp et al. | |
| 8,029,667 B2 * | 10/2011 | Santinon | 210/172.6 |
| 2004/0074538 A1 * | 4/2004 | Ortenzi et al. | 137/493.4 |
| 2006/0081634 A1 * | 4/2006 | Moessinger | 220/371 |

OTHER PUBLICATIONS

Pending U.S. Patent Application, entitled "Hydraulic System Having Dual Manifolds,", filed Nov. 30, 2012.

* cited by examiner

TANK BREATHER ASSEMBLY AND MOUNTING CONFIGURATION

TECHNICAL FIELD

The present disclosure relates generally to a breather assembly and, more particularly, to a breather assembly for a fluid tank and a mounting configuration for the breather assembly.

BACKGROUND

Machines such as a wheel loaders, wheeled scrapers, track-type tractors, on and off-highway haul trucks, motor graders, and other heavy equipment generally include hydraulic systems that facilitate different operations of the machines, including steering, braking, and tool movement, among others. These hydraulic systems include an assembly of components that work together to deliver pressurized hydraulic fluid to drive the operations of the machines. Typically, the components include a fluid tank dedicated to holding and filtering a desired supply of hydraulic fluid and an associated breather to protect the hydraulic system from contamination found in harsh industrial environments.

The breather is usually attached to a top of the fluid tank. The breather contains a filter element and functions by inhaling and exhaling air to regulate pressure within the fluid tank. The filter element of the breather cleanses the air entering the fluid tank. When the breather inhales, it serves as a pathway for air to enter the fluid tank without also transmitting accompanying pollutants found in the environment into the fluid tank. When the breather exhales, it discharges air and filtered particles dislodged from the filter element of the breather into the environment, while maintaining the fluid tank at a desired pressure.

During operation of the machine, hydraulic fluid housed in the fluid tank can churn and splash onto the filter element of the breather and/or deposit a mist on the filter element of the breather. This can accelerate wear of the breather and reduce its durability. Hydraulic fluid entrained in the air can also be discharged into the environment, if not properly filtered. The entrained hydraulic fluid can coat the surface and internal pathways of the breather, as well as the surrounding surface of the fluid tank. This coating can attract dust, dirt, and other pollutants, which can accumulate in the internal pathways of the breather and block the passage of air into and out of the fluid tank. This can undermine the breather's ability to maintain the fluid tank at a desired pressure, which can result in structural damage to the fluid tank. Additionally, the discharge of hydraulic fluid into the environment can present environmental concerns. The accumulation of dust, dirt, and other pollutants on the breather and the surface of the fluid tank can also result in an aesthetically displeasing appearance.

An exemplary breather is described in U.S. Pat. No. 1,841,691 that issued to Wilson ("the '691 patent") on Jan. 19, 1932. The breather is located above a top surface of a tank, and a stamped metal disk having a small central opening is positioned between the breather and the tank. A pan positioned above the stamped metal disk further separates the breather from the tank and collects solid or liquid particles filtered by the breather. To exit the tank through the breather, air laden with undesirable vapors must pass through the small central opening, a row of apertures along vertical walls of a washer, and a receptacle with a perforated bottom to reach an absorbent material. The absorbent material absorbs the undesirable vapor, entrains the air with moisture, and discharges the moisturized air into the environment. A reverse route is similarly followed for air entering the tank.

Although adequate for some applications, the configuration disclosed in the '691 patent may be less than optimal. This is because the central opening may be too small to properly maintain atmospheric pressure in the tank. In addition, the apertures of the '691 patent are vertically offset from the absorbent material, which may reduce the ability of the absorbent material to capture entrained liquids. Also, entrained liquids filtered by the breather may not be provided with an adequate return route back to the tank. This may require ongoing maintenance and service, which can be time consuming and expensive.

The breather assembly and mounting configuration of the present disclosure solves one or more of the problems set forth above and/or other problems in the art.

SUMMARY

In one aspect, the present disclosure is directed to a breather assembly. The breather assembly may include a mounting collar having a first end and an opposing second end. The first end of the mounting collar may be connected to a distal end of a fluid tank spout. The breather assembly may also include a breather insert connected to the mounting collar. The breather insert may have a perforated screen extending a distance past a base end of the fluid tank spout. The breather assembly may further include a breather cap having a first end and an opposing second end. The first end of the breather cap may be connected to the breather insert. The breather cap may also have a passage in common with a hollow center of the mounting collar.

In another aspect, the present disclosure may be directed to a mounting collar. The mounting collar may include a generally cylindrical body having a first end and an opposing second end. The generally cylindrical body may have a height of about 70-84 millimeters and a diameter of about 113-127 millimeters. The mounting collar may also include a central bore passing from the first end to the second end through the generally cylindrical body. The mounting collar may further include an internal surface located at the second end and angled at about a 40-50 degree angle to an axis of the central bore.

DETAILED DESCRIPTION

Figure 1:
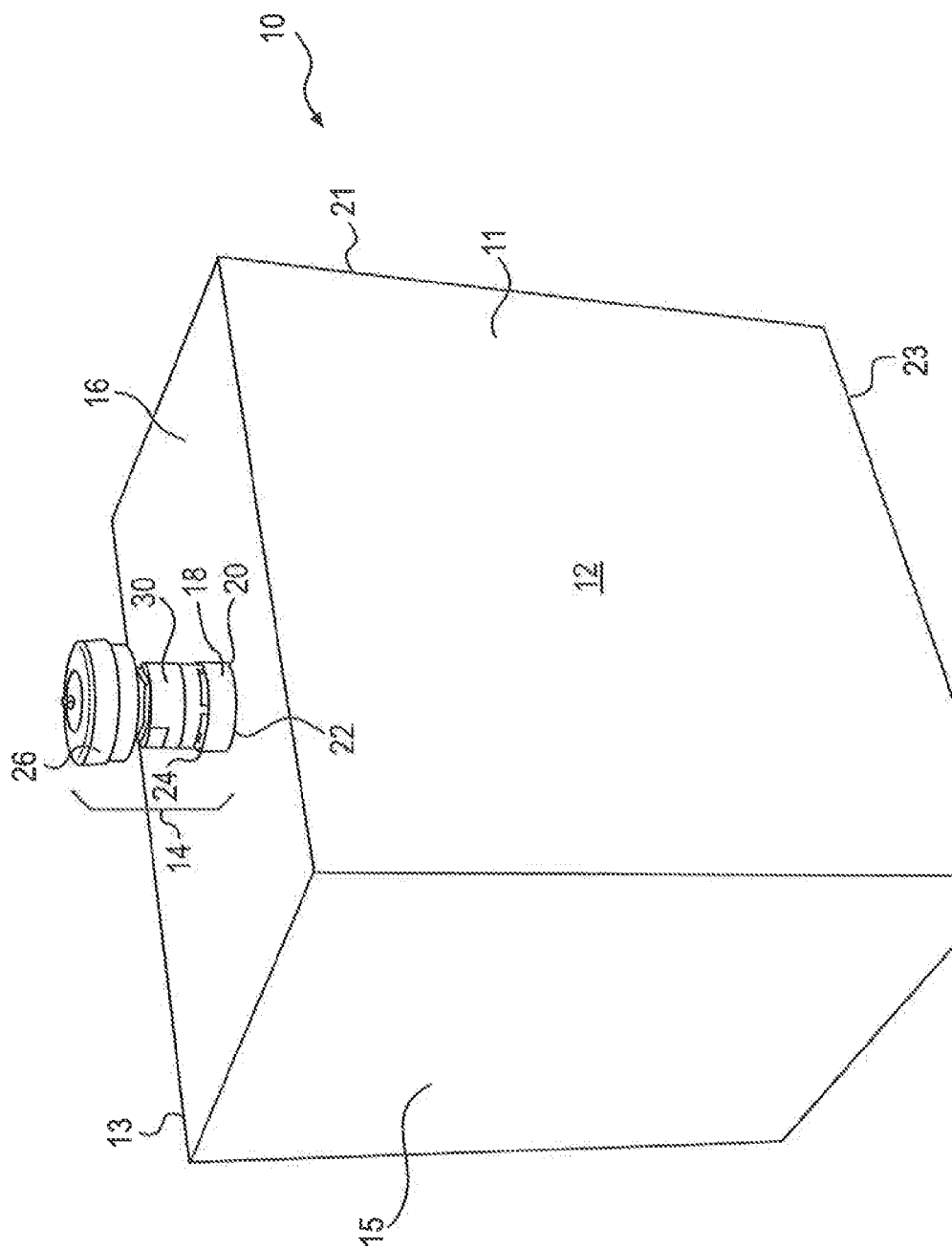
FIG. 1 is a perspective view illustration of an exemplary disclosed tank assembly.

FIG. 1 illustrates an exemplary embodiment of a tank assembly 10. Tank assembly 10 may include a fluid tank 12 and a breather assembly 14. Fluid tank 12 may include a front wall 11, a rear wall 13, a left-side wall 15, a right-side wall 21, an upper wall 16, and a bottom wall 23 that together substantially enclose a volume. Fluid tank 12 may serve as a reservoir configured to hold a supply of fluid. The fluid may include, for example, a dedicated hydraulic oil, an engine lubrication oil, a transmission lubrication oil, a fuel, or any other fluid known in the art. One or more hydraulic systems within a machine (not shown) may draw fluid from and return fluid to fluid tank 12.

Fluid tank 12 may further include an integral spout 18 located at about a general center of upper wall 16 at a circular opening 20. Integral spout 18 may be a hollow cylindrical body extending away from upper wall 16 and having a base end 22 and a distal end 24. Base end 22 may be open to an interior of fluid tank 12 via opening 20. Integral spout 18 may be configured to receive breather assembly 14 at distal end 24, in the disclosed embodiment, integral spout 18 is attached to fluid tank 12 at base end 22 by way of welding. It is contemplated, however, that integral spout 18 can alternatively be attached to fluid tank 12 by way of a threaded interface at base end 22 or integrally formed (e.g., via rotational molding from a high-density polyethylene plastic material).

Figure 2:
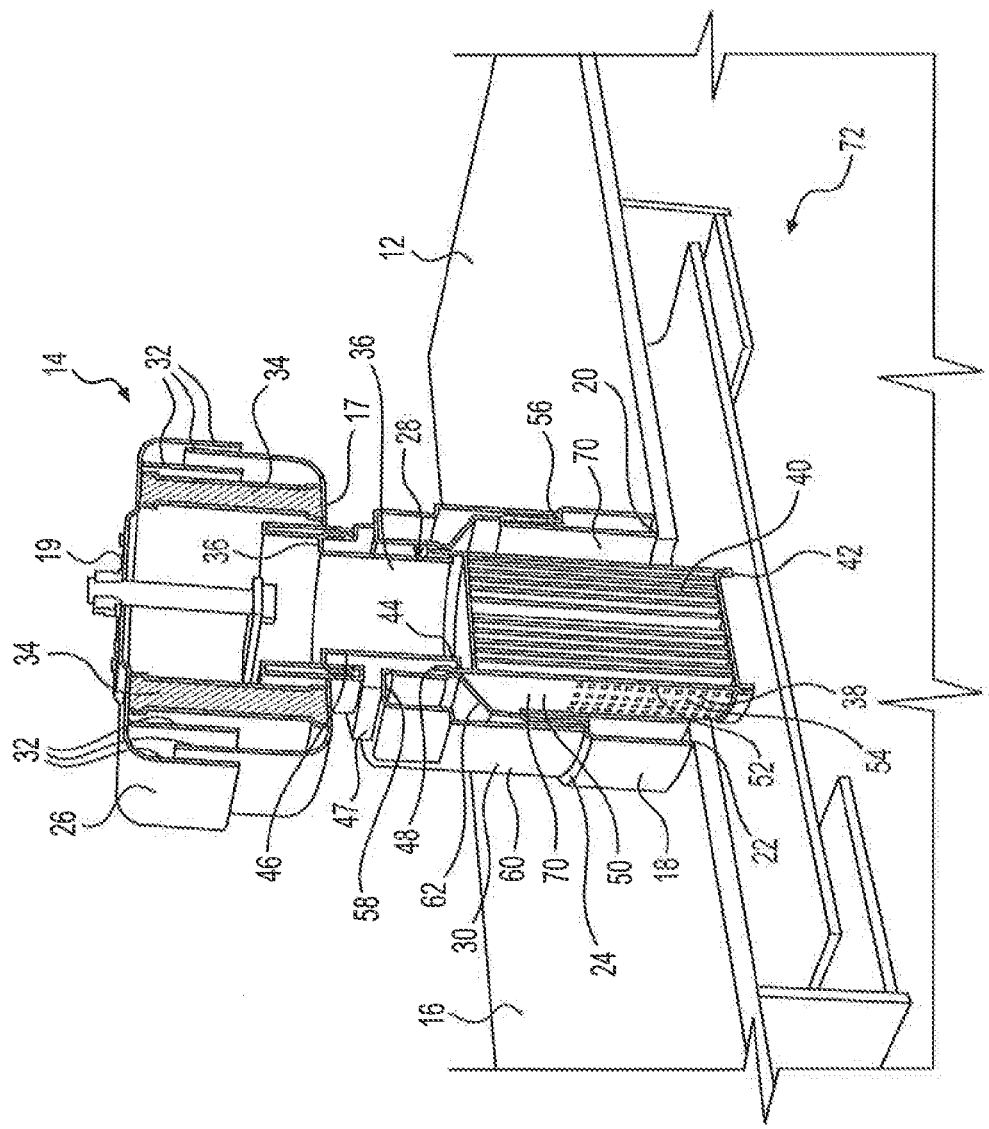
FIG. 2 is a cut-away perspective view illustration of an exemplary disclosed breather assembly.
Figure 3:
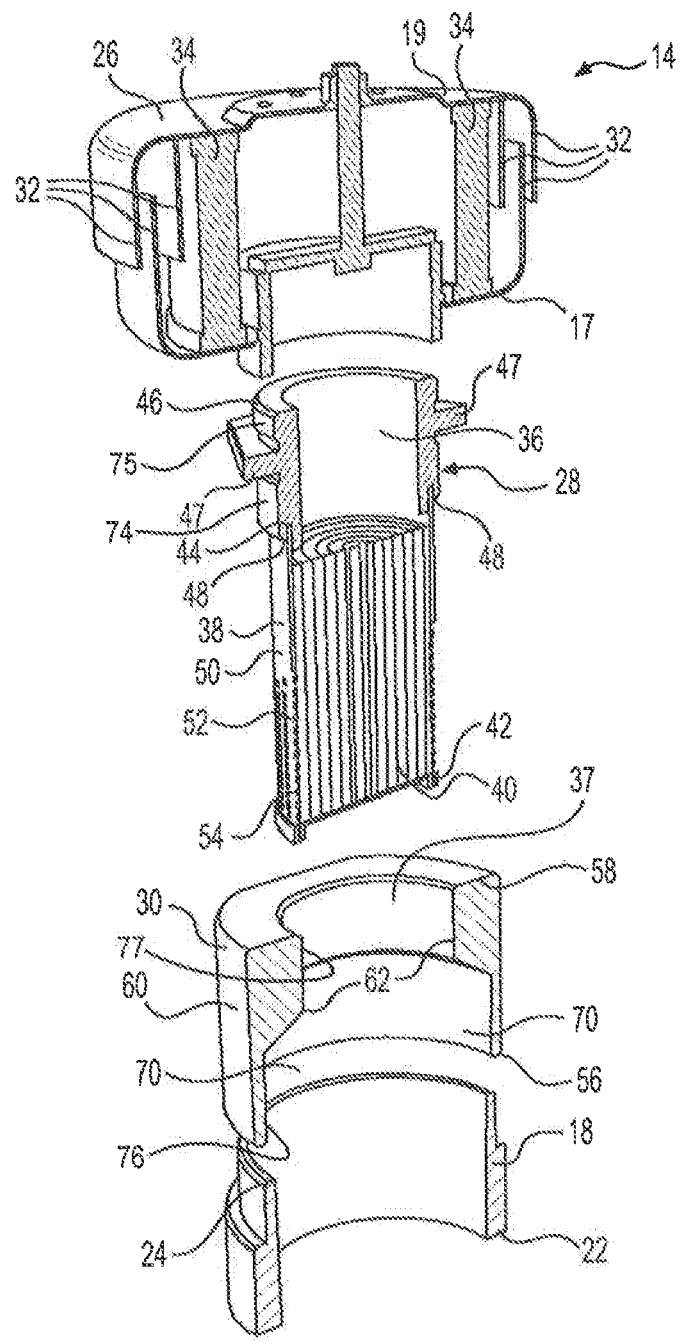
FIG. 3 is a semi-exploded diagrammatic illustration of the breather assembly of FIG. 2.

As shown in FIGS. 2 and 3, breather assembly 14 may function to allow air into and/or out of fluid tank 12 during draining and filling of fluid tank 12. For example, breather assembly 14 may allow air into fluid tank 12 to replace a volume of fluid tank 12 previously occupied by hydraulic fluid that has been consumed by an associated hydraulic system. Similarly, breather assembly 14 may allow air out of fluid tank 12 to permit space for the hydraulic fluid returning to fluid tank 12.

Breather assembly 14 may include a breather cap 26, an elongated breather insert 28 extending downward from breather cap 26 into integral spout 18, and a mounting collar 30 attaching breather assembly 14 to fluid tank 12. Breather cap 26 may be a generally cylindrical body having a base end 17 and a distal end 19 and including overlapping annular walls 32. In the disclosed embodiment, breather cap 26 includes three annular walls 32 radially spaced apart from each other and surrounding an I-shaped filter media 34.

Air may enter breather assembly 14 from a perimeter of breather cap 26 and navigate via a serpentine pattern around ends of annular walls 32 and through filter media 34 to reach an axial end of breather insert 28. Filter media 34 may be configured to inhibit movement of debris passing through breather assembly 14, to separate the debris from the air. Filter media 34 may be formed from a porous or mesh material. In the disclosed embodiment, filter media 34 is fabricated from a phenolic resin-impregnated paper. The debris may be maintained within filter media 34. In this manner, air may be provided with a passageway to breather insert 28 while also hindering an ability of other elements, such as rain, to enter fluid tank 12.

Breather insert 28 may include a plurality of components that function together to cleanse air traveling through breather assembly 14. Breather insert 28 may include, among other things, a coupling 36, a screen 38, a filter media 40, and an obstructing rim 42. Coupling 36 may include a first end 44 and an opposing second end 46 and may generally form a hollow conduit. First end 44 of coupling 36 may include threads 74 to receive mounting collar 30. Second end 46 of coupling 36 may attach to base end 17 of breather cap 26. In the disclosed embodiment, second end 46 of coupling 36 also includes threads 75 to receive base end 17 of breather cap 26, although other ways to connect coupling 36 with breather cap 26 may be utilized. Coupling 36 may also include a flange 47 encircling a perimeter of coupling 36 and positioned slightly below second end 46 (i.e., between first end 44 and second end 46). Flange 47 may form an interface between breather cap 26 and mounting collar 30 and help seal breather cap 26 to mounting collar 30. Coupling 36 may connect to screen 38 at first end 44. In particular, first end 44 may include an annular groove 48 that receives screen 38. In the disclosed embodiment, screen 38 is aluminum. It is contemplated, however, that screen 38 may be assembled from any suitable material known in the art, for example, from a plastic or other non-corrosive metal.

Screen 38 may include a generally solid upper half 50 and a perforated lower half 52. Perforated lower half 52 may be characterized by apertures 54 arranged in axially spaced rows. It is contemplated that apertures 54 may be of variable diameters or consistent diameters. In the disclosed embodiment, apertures 54 generally have consistent diameters of about 2-4 millimeters. Perforated lower half 52 may be in general alignment at its upper end with distal end 24 of integral spout 18. Perforated lower half 52 of screen 38 may be configured to block passage of large debris through breather assembly 14.

Screen 38 may be open at its upper end (i.e., at upper half 50) and closed at its lower end. (i.e., at lower half 52) by obstructing rim 42. Obstructing rim 42 may force air to flow in a radial direction through apertures 54 of screen 38 by substantially blocking vertical airflow into or out of fluid tank 12 via a direct axial path through breather insert 28. It is also contemplated that obstructing rim 42 may be perforated to permit some vertical airflow into or out of fluid tank 12 via a direct axial path through breather insert 28.

Screen 38 may provide an outer form to enclose and support filter media 40. Filter media 40 may be formed from a porous or mesh material arranged in a regularly or irregularly shaped pattern. In the disclosed embodiment, filter media 40 is fabricated from a wire mesh. Filter media 40 may be configured to inhibit movement of hydraulic fluid entrained in air passing through breather assembly 14, to separate the hydraulic fluid from the air. The hydraulic fluid prevented from flowing through breather assembly 14 and out of fluid tank 12 may drain from filter media 40, downward under the force of gravity through a splashguard 72 positioned below opening 20 within fluid tank 12, and back into fluid tank 12.

Mounting collar 30 may be generally cylindrical and configured to fixedly retain breather assembly 14 connected to integral spout 18. Mounting collar 30 may have a height of about 70-84 millimeters and a diameter of about 113-127 millimeters. In the disclosed embodiment, mounting collar 30 has a height of about 77 millimeters and a diameter of about 120 millimeters. Mounting collar 30 may include circular openings at a first end 56 and an opposing second end 58. First end 56 may include threads 76 to engage distal end 24 of integral spout 18. Second end 58 may include threads 77 to engage coupling 36 of breather insert 28. A central bore 37 may pass from first end 56 to second end 58. In the disclosed embodiment, first end 56 includes threads 76 having an axial length of about 25 millimeters and second end 58 includes threads 77 having an axial length of about 27 millimeters. It is contemplated, however, that first end 56 may include threads 76 having an axial length of about 23-27 millimeters and second end 58 may include threads 77 having an axial length of about 25-29 millimeters. In the disclosed embodiment, mounting collar 30 is fabricated from steel. It is contemplated, however, that mounting collar 30 may be assembled from any suitable material known in the art, for example, from a plastic or other metals.

Mounting collar 30 may include an outer surface 60 and an internal surface 62. Internal surface 62 may be positioned at an angle to screen 38 to provide a clearance 70 between internal surface 62 of integral spout 18 and mounting collar 30, and screen 38. In the disclosed embodiment, internal surface 62 is positioned at about a 45 degree to screen 38. It is contemplated, however, that internal surface 62 may be positioned at about a 40-50 degree to screen 38. After entering breather assembly 14 via breather cap 26, air may flow axially through upper half 50 of breather insert 28 until it reaches perforated lower half 52, whereupon the air may flow radially outward through apertures 54 into clearance 70.

A significant percentage of screen 38 and filter media 40 may be located above upper wall 16 of fluid tank 12. It is contemplated that about 75-95% of screen 38 may extend above upper wall 16 of fluid tank 12, it is further contemplated that lower half 52 of screen 38 may be in general alignment with base end 22 of integral spout 18. In the disclosed embodiment, about 85% of screen 38 extends above upper wall 16 of fluid tank 12, and about 15% of screen 38 extends into fluid tank 12. In this manner, screen 38 may be exposed to a reduced amount of hydraulic fluid during splashing and churning of hydraulic fluid in fluid tank 12.

INDUSTRIAL APPLICABILITY

The disclosed breather assembly may be used with any fluid tank known in the art. For example, the breather assembly of the present disclosure may be used in connection with hydraulic tanks, fuel tanks, lubrication tanks, and cooling tanks, among others. The disclosed breather assembly 14 may allow passage of gases to maintain a desired pressure within fluid tank 12 while also filtering the gases of debris and liquids.

During an exemplary operation, breather assembly 14 may inhale air as pressure falls in fluid tank 12. Air may enter breather assembly 14 via gaps between annular walls 32 of breather cap 26 and navigate through filter media 34 to reach upper half 50 of breather insert 28. Filter media 34 may cleanse the air as it travels toward upper half 50 of breather insert 28. Upon reaching lower half 52 of breather insert 28, the air may flow in a radial direction through apertures 54 into clearance 70 and then into fluid tank 12. In this manner, breather assembly 14 may serve as a pathway for air to enter fluid tank 12 without also transmitting accompanying pollutants found in the surrounding environment into fluid tank 12.

Similarly, during exemplary operation, breather assembly 14 may exhale air as pressure rises in fluid tank 12. Air may rise from fluid tank 12 into clearance 70 and flow in a radial direction through apertures 54 of lower half 52 of breather insert 28 into filter media 40. Filter media 40 may help trap hydraulic fluid entrained in the air within the confines of filter media 40 as the air travels upward. The location of apertures 54 in lower half 52 may help reduce a possibility of entrained hydraulic fluid bypassing filter media 40. In particular, apertures 54 may force air entrained with hydraulic fluid to travel at least a length of upper half 50, thereby subjecting the entrained air to a greater exposure of filter media 40. This may facilitate a higher probability of capturing hydraulic fluid entrained in the air before the air reaches filter media 34 or the surrounding environment.

A portion of the hydraulic fluid prevented from flowing through breather assembly 14 and out of fluid tank 12 may be collected (e.g., coalesced) in filter media 40, while another portion of hydraulic fluid collected in filter media 40 may be returned to fluid tank 12. After passing through filter media 40, air may flow through filter media 34. Hydraulic fluid entrained in the air may further be separated from the air by filter media 34 before flowing through the gaps in annular walls 32 of breather cap 26 to enter the surrounding environment. In this manner, filter media 34, 40 may help prevent air entrained with hydraulic fluid from reaching filter media 34 or the surrounding environment, while maintaining fluid tank 12 at a desired pressure.

Breather assembly 14 may also help reduce an exposure of screen 38 and filter media 40 to a churning and splashing of hydraulic fluid in fluid tank 12 by facilitating an axial location of screen 38 and filter media 40 above fluid tank 12. In this manner, breather assembly 14 may help reduce the discharging of entrained hydraulic fluid into the surrounding environment. Additionally, by helping to reduce the exposure of filter media 34, 40 to hydraulic fluid, breather assembly 14 may also increase the durability and life expectancy of filter media 34, 40.

It will be apparent to those skilled in the art that various modifications and variations can be made to the disclosed breather assembly without departing from the scope of the disclosure. Other embodiments of the breather assembly will be apparent to those skilled in the art from consideration of the specification and practice of the breather assembly disclosed herein. It is intended that the specification and examples be considered as exemplary only, with a true scope of the disclosure being indicated by the following claims and their equivalents.

What is claimed is:

1. A breather assembly, comprising:
    a mounting collar having a first end and an opposing second end, the first end of the mounting collar being connected to a distal end of a fluid tank spout;
    a breather insert connected to the second end of the mounting collar and having a perforated screen extending a distance past a base end of the fluid tank spout, wherein the perforated screen includes:
        a lower half and an upper half, the upper half not extending past the first end of the mounting collar; and
        apertures arranged in only the lower half, wherein the apertures extend at least a first distance above the base end of the fluid tank spout, and a second distance below the base end of the fluid tank spout, wherein the first distance is greater than the second distance; and
    a breather cap having a first end and an opposing second end, the first end of the breather cap being connected to the breather insert and having a passage in communication with a hollow center of the mounting collar.

2. The breather assembly of claim 1, wherein the distance past the base end of the fluid tank spout is about 5-25% of an axial length of the perforated screen.

3. The breather assembly of claim 1, wherein the breather insert projects downward from the first end of the breather cap toward the mounting collar.

4. The breather assembly of claim 1, wherein the breather insert further includes:
    a coupling having an annular groove configured to receive a first end of the perforated screen;
    a filter media encircled by the perforated screen; and
    an obstructing rim located at a second end of the perforated screen.

5. The breather assembly of claim 4, wherein the apertures of the perforated screen each have a diameter of about 2-4 millimeters.

6. The breather assembly of claim 5, wherein the filter media is fabricated from a wire mesh.

7. The breather assembly of claim 6, wherein the apertures are located radially outward of the wire mesh of the breather insert.

8. The breather assembly of claim 1, wherein:
    the filter media is a first filter media;
    the breather cap further includes a second filter media; and
    the second filter media is fabricated from a phenolic resin-impregnated paper.

9. The breather assembly of claim 1, wherein:
the mounting collar is connectable to the fluid tank spout by way of a first threaded interface;
the mounting collar is connectable to the breather insert by way of a second threaded interface; and
the breather cap is connectable to the breather insert by way of a third threaded interface.

10. The breather assembly of claim 1, wherein the breather cap includes overlapping annular walls.

11. The breather assembly of claim 1, wherein the first and second ends of the mounting collar are circular openings.

12. The breather assembly of claim 1, wherein the mounting collar is fabricated from a metallic material.

13. The breather assembly of claim 1, wherein the mounting collar includes an internal surface positioned at about a 40-50 degree angle to the perforated screen.

14. The breather assembly of claim 1, wherein the mounting collar has a height of about 70-84 millimeters and a diameter of about 113-127 millimeters.

15. A fluid tank, comprising:
a plurality of walls connected to each other to substantially enclose a volume, the plurality of walls including a top wall; and
an opening in the top wall configured to receive a first end of a breather assembly, wherein the breather assembly includes:

a mounting collar having a first end and an opposing second end, the first end of the mounting collar being connected to a distal end of a fluid tank spout;

a breather insert connected to the mounting collar, the breather insert having a perforated screen extending about 5-25% of an axial length of the perforated screen past a base end of the fluid tank spout, wherein the perforated screen includes:

a lower half and an upper half, the upper half not extending past the first end of the mounting collar; and apertures arranged in only the lower half, wherein the apertures extend at least a first distance above the base end of the fluid tank spout, and a second distance below the base end of the fluid tank spout, wherein the distance is greater than the second distance;

a breather cap having a first end and an opposing second end, the first end of the breather cap being connected to the breather insert and having a passage in communication with a hollow center of the mounting collar; and a splashguard located within the fluid tank in general alignment with the opening in the top wall.

* * * * *